US010200956B2

(12) United States Patent
Rubenstein et al.

(10) Patent No.: US 10,200,956 B2
(45) Date of Patent: Feb. 5, 2019

(54) SYSTEMS AND METHODS FOR THROUGHPUT ENHANCEMENT AMONG ULTRA-LOW POWER WIRELESS NETWORK DEVICES

(71) Applicant: THE TRUSTEES OF COLUMBIA UNIVERSITY IN THE CITY OF NEW YORK, New York, NY (US)

(72) Inventors: Daniel Rubenstein, New York, NY (US); Gil Zussman, New York, NY (US); Javad Ghaderi, New York, NY (US); Robert Margolies, Wayne, NJ (US); Tingjun Chen, Shenzhen (CN); Guy Grebla, Ramat Yishai (IL)

(73) Assignee: The Trustees of Columbia University in the City of New York, New York, NY (US)

( * ) Notice: Subject to any disclaimer, the term of this patent is extended or adjusted under 35 U.S.C. 154(b) by 35 days.

(21) Appl. No.: 15/211,740

(22) Filed: Jul. 15, 2016

(65) Prior Publication Data
US 2017/0019861 A1  Jan. 19, 2017

Related U.S. Application Data

(60) Provisional application No. 62/193,504, filed on Jul. 16, 2015, provisional application No. 62/217,624, (Continued)

(51) Int. Cl.
H04W 52/02  (2009.01)
H04W 40/00  (2009.01)
(Continued)

(52) U.S. Cl.
CPC ......... H04W 52/0274 (2013.01); H04L 45/26 (2013.01); H04L 67/1061 (2013.01);
(Continued)

(58) Field of Classification Search
CPC ..... H04L 67/1061; H04L 69/28; H04L 45/26; H04W 52/0274; H04W 40/005;
(Continued)

(56) References Cited

U.S. PATENT DOCUMENTS 9,014,042 B2    4/2015  Fraboulet et al.
2012/0056728 A1* 3/2012  Erdmann ............ H04L 12/2827
                                         340/12.5

(Continued)

FOREIGN PATENT DOCUMENTS

WO    2015006636 A1    1/2015

OTHER PUBLICATIONS

Kim K et al. PND: a p-persistent neighbor discovery protocol in wireless networks. Wirel. Commun. Mob. Comput. 2013; 13:650-662.
(Continued)

Primary Examiner — Jianye Wu
(74) Attorney, Agent, or Firm — Bryan Cave Leighton Paisner LLP

(57) ABSTRACT

Systems and methods for throughput enhancement including asynchronous neighbor discovery among ultra-low power wireless network devices are provided. Specifically, techniques for discovering neighboring wireless devices within an energy-harvesting and/or energy constrained wireless communication network are provided such that the wireless devices are able to discover the greatest number of neighboring devices without exceeding the energy that they have accumulated by, for example, harvesting ambient sources or their allocated energy budget (e.g., battery/capacitor levels). Such devices are capable of transmitting and receiving data such as discovery messages and alternate between different operation states (e.g., listen, sleep, transmit) and are able to compute transitions rates in a centralized and/or distributed
(Continued)

manner using either homogeneous or heterogeneous wireless devices.

21 Claims, 8 Drawing Sheets

Related U.S. Application Data filed on Sep. 11, 2015, provisional application No. 62/288,330, filed on Jan. 28, 2016.

(51) Int. Cl.
    *H04W 4/02*     (2018.01)
    *H04L 29/06*     (2006.01)
    *H04L 29/08*     (2006.01)
    *H04L 12/721*     (2013.01)

(52) U.S. Cl.
    CPC .............. *H04L 69/28* (2013.01); *H04W 4/023* (2013.01); *H04W 40/005* (2013.01); *Y02D 70/00* (2018.01); *Y02D 70/1262* (2018.01); *Y02D 70/142* (2018.01)

(58) Field of Classification Search
    CPC .... H04W 4/023; Y02B 60/50; Y02F 70/1262; Y02F 70/142; Y02F 70/00
    See application file for complete search history.

(56) References Cited

U.S. PATENT DOCUMENTS

2013/0121176 A1    5/2013    Addepalli et al.
2014/0269467 A1    9/2014    Samanta Singhar et al.

OTHER PUBLICATIONS

Sun W et al. Hello: A Generic Flexible Protocol for Neighbor Discovery. IEEE INFOCOM 2014—IEEE Conference on Computer Communications.

R. Margolies, et al. "Panda: Neighbor Discovery on a Power Harvesting Budget," 10.1109/INFOCOM.2016.7524505. (2016).

B. Huang, et al. "Fast b-matching via Sufficient Selection Belief Propagation," 14th International Conference on Artificial Intelligence and Statistics (AISTATS), 2011.

B. Huang, et al. "Loopy Belief Propagation for Bipartite Maximum Weight b-Matching," Artificial Intelligence and Statistics (AISTATS), Mar. 2007.

T. Jebara, et al. "B-Matching for Spectral Clustering," European Conference on Machine Learning (ECML), Sep. 2006.

A. Weller, et al. "Approximating the Bethe Partition Function," Uncertainty in Artificial Intelligence (UAI), 2014.

T. Jebara, et al. "Graph Construction and b-Matching for Semi-Supervised Learning," International Conference on Machine Learning (ICML) Jun. 2009.

M. Loecher, et al., "CitySense: Multiscale Space Time Clustering of GPS Points and Trajectories," Proceedings of the Joint Statistical Meeting (JSM), 2009.

B. Huang, et al. "Exact Graph Structure Estimation with Degree Priors," International Conference on Machine Learning and Applications (ICMLA), Dec. 2009.

R. Kondor, et al. "Multi-object tracking with representations of the symmetric group," Artificial Intelligence and Statistics (AISTATS), Mar. 2007.

J. Reich, et al. "Connectivity Maintenance in Mobile Wireless Networks via Constrained Mobility," Proceedings of IEEE Infocom, Shanghai, China Apr. 2011.

M. Gorlatova, et al. "Challenge: Ultra-Low-Power Energy-Harvesting Active Networked Tags (EnHANTs)," Proceedings of ACM Mbicom, Beijing China Sep. 2009.

A. Kamra, et al. "Growth Codes: maximizing Sensor Network Data Persistence," Proceedings of ACM Sigcom, Pisa, Italy Sep. 2006.

B. Ko, et al. "A Distributed, Self-stabilizing Protocol for Placement of Replicated Resources in Emerging Networks," IEEE/ACM Transactions on Networking, vol. 13, No. 3, Jun. 2005.

A. Keromytis, et al. "SOS: An Architecture for Mitigating DDoS Attacks," IEEE Journal of Selected Areas in Communications (JSAC) Special issue on Service Overlay Networks, vol. 22, No. 1, Jan. 2004.

D. Rubenstein, et al. "Detecting Shared Congestion of Flows Via End-to-end Measurement," IEEE/ACM Transactions on Networking, vol. 10, No. 3, Jun. 2002.

T. Ma, et al. "An Analysis of Generalized Slotted-Aloha Protocols," IEEE/ACM Transactions on Networking, vol. 17, No. 3, 2009.

V. Bahl, et al. "Opportunistic Use of Client Repeaters to Improve Performance of WLANs," IEEE/ACM Transactions on Networking, vol. 17, No. 4, pp. 1160-1171, Aug. 2009.

V. Navda, et al. "Using Channel Hopping to Increase 802.11 Resilience to Jamming Attacks," IEEE Infocom Minisymposium, Anchorage, AK May 2007.

H. Chang, et al. "A General Model and Analysis of Physical Layer Capture in 802.11 Networks," Proceedings of IEEE Infocom, Barcelona, Spain Apr. 2003.

T. Jebara, "MAP Estimation, Message Passing, and Perfect Graphs," Uncertainty in Artificial Intelligence (UAI) Jun. 2009.

A. Moghadam, et al. "A Markov Routing Algorithm for Mobile DTNs Based on Spatio-Temporal Modeling of Human Movement Data," Fourteenth ACM International Conference on Modeling, Analysis and Simulation of Wireless and Mobile Systems (MSWiM) 2011.

\* cited by examiner

SYSTEMS AND METHODS FOR THROUGHPUT ENHANCEMENT AMONG ULTRA-LOW POWER WIRELESS NETWORK DEVICES

CROSS-REFERENCE TO RELATED APPLICATIONS

The present application claims the benefit of U.S. Provisional Patent Application No. 62/193,501, filed on Jul. 16, 2015, U.S. Provisional Patent Application No. 62/217,624, filed on Sep. 11, 2015 and U.S. Provisional Patent Application No. 62/288,330 filed on Jan. 28, 2016. The contents of the above-identified applications are incorporated by reference in their entirety as if recited in full herein.

STATEMENT REGARDING FEDERALLY SPONSORED RESEARCH AND DEVELOPMENT

This invention was made with government support under contract CCF 0964497 awarded by the National Science Foundation and contract CNS-1054856 awarded by the National Science Foundation. The government has certain rights in the invention.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Self-powered wireless communication networks rely on ultra-low power wireless devices that can harvest energy from ambient sources and rely on efficient device-to-device discovery for facilitating the exchange of data and information. General throughput enhancement (e.g., maximization) techniques, including neighbor discovery, are constrained by the available power that each device can consume for communicating within the network. For example, these self-powered wireless communication networks rely on ultra-low power wireless devices that continuously harvest energy from ambient sources or have a specific energy budget associated with their operation. In order to ensure long term or near perpetual operation, the ultra-low power wireless devices operate at a low duty cycle that requires them to enter a sleep state to conserve energy. The wireless devices can be attached to any object such as home devices, medical devices and objects in a transportation chain.

Low-powered, energy-harvesting and/or energy constrained communication networks can facilitate the Internet of Things (IoT) by providing a network infrastructure that enables the networked objects to exchange data by discovering neighboring devices and, as a result, provide for the monitoring and tracking of such objects for extended periods of time. Prior communication techniques (e.g., Wi-Fi or LTE), however, are inefficient for ultra-low power energy-harvesting wireless devices. For example, wireless protocols such as Wi-Fi allocate larger energy budgets for their operation and require synchronized device-to-device discovery protocols.

SUMMARY

In some embodiments, systems and methods for throughput enhancement among ultra-low power wireless network devices are provided. Specifically, techniques for throughput enhancement also allow for discovering neighboring wireless devices within an energy-harvesting and/or energy constrained wireless communication network such that the wireless devices are able to discover the greatest number of neighboring devices without exceeding the energy that they have accumulated by, for example, harvesting ambient sources or their allocated energy budget (e.g., battery/capacitor levels). Such systems allow for objects that are traditionally not connected to be tracked and monitored using self-powered devices in an energy-aware manner. In some embodiments, such techniques can be employed in a centralized manner where knowledge of system parameters (e.g., number of devices, communication costs, energy budget) is provided across the network and/or in a distributed manner, where each device has no knowledge of other devices or parameters and, as such, it is only aware of its own operational parameters. Furthermore, in some embodiments such systems do not require the use of control messaging to ensure that the wireless devices are capable of enhancing their throughput and thus discovering their neighbors when their location and/or any other operation parameter changes. Exemplary applications of such systems can be found in healthcare, smart buildings, manufacturing and intelligent transportation.

In some embodiments, energy-harvesting self-powered wireless devices are capable of transmitting and receiving discovery messages within a wireless network to ensure asynchronous neighbor discovery as part of throughput enhancement. In some embodiments, such techniques can be employed in a centralized manner where knowledge of system parameters (e.g., number of devices, communication costs, energy budget) is provided across the network and/or in a distributed manner, where each device has no knowledge of other devices or parameters and, as such, it is only aware of its own operational parameters. Furthermore, in some embodiments such systems do not require the use of control messaging to ensure that the wireless devices are capable of discovering their neighbors when their location and/or any other operation parameter changes.

In some embodiments, energy-harvesting and/or energy constrained self-powered wireless devices can be heterogeneous (e.g., have different energy budgets and power consumption costs) and thus their parameters can be configured and adapted differently allowing for dynamic changes in the wireless network.

In some embodiments, ultra-low power wireless devices are capable of transmitting and receiving data such as discovery messages, combinations of messages and/or any other suitable signals within a wireless network to ensure throughput enhancement including asynchronous neighbor discovery. This is accomplished by allowing the wireless devices to alternate between different operation states and computing or determining transitions rates and as a result durations for which the wireless devices operate in the different states. For example, a wireless device can alternate between a listen state (e.g., listening for discovery messages and/or any suitable data messages from neighboring devices), a sleep state (e.g., conserving energy by entering a low-powered mode) and a transmit state (e.g., transmitting a discovery message and/or data to neighboring devices).

For example, in some embodiments, after a discovery message is received by a wireless device, the device enters a sleep state to conserve energy and allow for perpetual operation of the system. If a discovery message is not detected by a wireless device during the listening period, then the wireless device transmits a discovery message to the wireless network. Upon transmitting the discovery message, the wireless device then enters a sleep state.

In addition, in some embodiments, after a discovery message is received by a wireless device, the device enters a listen state to allow for discovering additional neighboring devices. If a discovery message is not detected by a wireless device during the listening period, then the wireless device can either enter a sleep state to conserve and/or recover energy or a transmit state in order to communicate a discovery message to its neighboring devices. Moreover, if a wireless device is in a sleep state then it can "wake-up" and either enter a listen state in order to receive discovery messages or it can go back to a sleep state and continue to conserve and/or recover energy.

In some embodiments, the listening duration and sleep duration for the wireless devices (e.g., durations/fractions of time in a specific operation state) are determined in an energy-aware manner (e.g., based on the devices' energy budgets, namely harvested and/or stored energy). Specifically, the appropriate listening, transmit and sleep durations are determined in a way that enhances and/or maximizes the number of expected neighbors that can be discovered while simultaneously ensuring that the energy consumptions associated with listening, receiving and transmitting discovery messages do not exceed the provided energy budget (e.g., harvested energy from ambient sources, battery levels etc.). As a result, communication rates among the discovered wireless devices would be increased and throughput overall would be enhanced.

In some embodiments, the wireless devices harvest energy in a heterogeneous manner and/or have heterogeneous energy budgets and are arranged in different formations (e.g., mesh, star, clique) where data (e.g., discovery messages) may or may not be received due to interfering noise or network interruptions. For example, certain wireless devices may very well harvest energy at a different rate from neighboring wireless devices and/or consume energy at different rates. Specifically, in such environments, the appropriate listening duration and sleep duration are determined dynamically. In some embodiments the wireless devices can include an energy storage medium such as a capacitor and/or battery or any other suitable energy storage circuitry. Additionally, the sleep duration for such wireless devices is determined, and can dynamically change, based on the voltage of the energy storage medium. Specifically, a wireless device will increase its sleeping duration if it consumes too much power and remain in a sleep state for a longer duration in order to ensure perpetual operation. In some embodiments, the wireless devices can include an energy storage medium such as a capacitor and/or battery or any other suitable energy storage circuitry.

In some embodiments, the appropriate listening, transmit and sleep durations are determined in a way that enhances (e.g., maximizes) throughput among the devices while not exceeding the provided energy budgets. Specifically, in some embodiments, throughput can be measured as a sum of throughputs delivered to each receiving wireless device, where each transmitted data message is counted once per receiving device (e.g., a form of group throughput). In some embodiments, throughput can be measured as a sum of throughputs of transmitted data messages to at least one receiving wireless device (e.g., a form of throughput associated with any of the wireless devices).

In some embodiments, computing or determining such durations relating to the different operation states of the wireless devices can be accomplished in a centralized manner. For example, a determination can be made by computing for the different combinations of operation states for the networked devices such that the energy budget is not exceeded and the aggregate number of discovered neighboring devices is enhanced (e.g., maximized). Furthermore, in some embodiments, an iterative approach can be employed by choosing which wireless device transmits data (e.g., a discovery message) based on its energy budget and determining a transmitting duration based on the energy budgets of the neighboring devices.

In some embodiments, the different operation states can be represented by time slots during which a wireless device that is awake can either transmit or receive data. Moreover, in some embodiments, a coordinating device can determine in a centralized manner a periodic schedule and compute the number of time slots (e.g., the fraction of time) during which a wireless device operates in the transmit and listen states without exceeding the energy budget.

In some embodiments, computing or determining the durations for the different operation states of the wireless devices can be accomplished in a distributed manner. For example, each wireless device can compute and adapt the durations during which it sleeps, listens and transmits data (e.g., discovery messages) based on the stored energy (e.g., by observing battery dynamics). In some embodiments, a wireless device can use counters (e.g., exponentially distributed counters) that determine the likelihood that a device will enter an operation state based on the stored energy.

In some embodiments, neighboring devices that are in a listen state and may subsequently receive data such as, for example, discovery messages can provide feedback to the devices in order to indicate that they have entered the listen state and are capable of receiving discovery messages. For example, in such cases, an acknowledgment signal can be transmitted among the networked devices, allowing each of the devices to make a determination as to whether it should transmit a discovery message. In some embodiments, a device can estimate the number of neighboring devices that are actively listening. Specifically, if a device receives feedback messages from multiple neighboring devices, then it is more likely to enter a transmit state in order to enhance (e.g., maximize) the number of discovered neighbors. In some embodiments, such feedback can be low cost, short pings that any other device can receive or any other suitable feedback signal. Furthermore, in some embodiments, such pings do not carry any information and as such do not effectively consume additional bandwidth. In some embodiments, the wireless devices can transmit pings at a predetermined rate in order to facilitate an estimate of active listener devices by either measuring the count of pings and/or the time until the first ping arrives or the inter-arrival times of pings. In some embodiments, exponential random timers can be used in order to generate an estimate of neighboring devices that are in a listen state, thereby allowing a device to determine when to enter a transmit state such that it can maximize the number of discovered neighbors. In some embodiments, such feedback mechanisms can be achieved by effectively "capturing" a transmitting device, whereby the device is more likely to retransmit a discovery message based on the received feedback from neighboring devices, thus limiting when feedback estimation is required. In some embodiments, a non-capturing technique can be employed such that each wireless device dynamically adjusts its estimate of active listeners in order to decide whether it will enter the transmit state.

In some embodiments, the wireless devices can reserve energy associated with transmitting and listening data for a later time. For example, a wireless device can receive a "token" for an action and reserve energy for that token. The wireless device can subsequently "cash in" its tokens at a later time and not enter a sleep state.

BRIEF DESCRIPTIONS OF THE DRAWINGS

DETAILED DESCRIPTION

Figure 1:
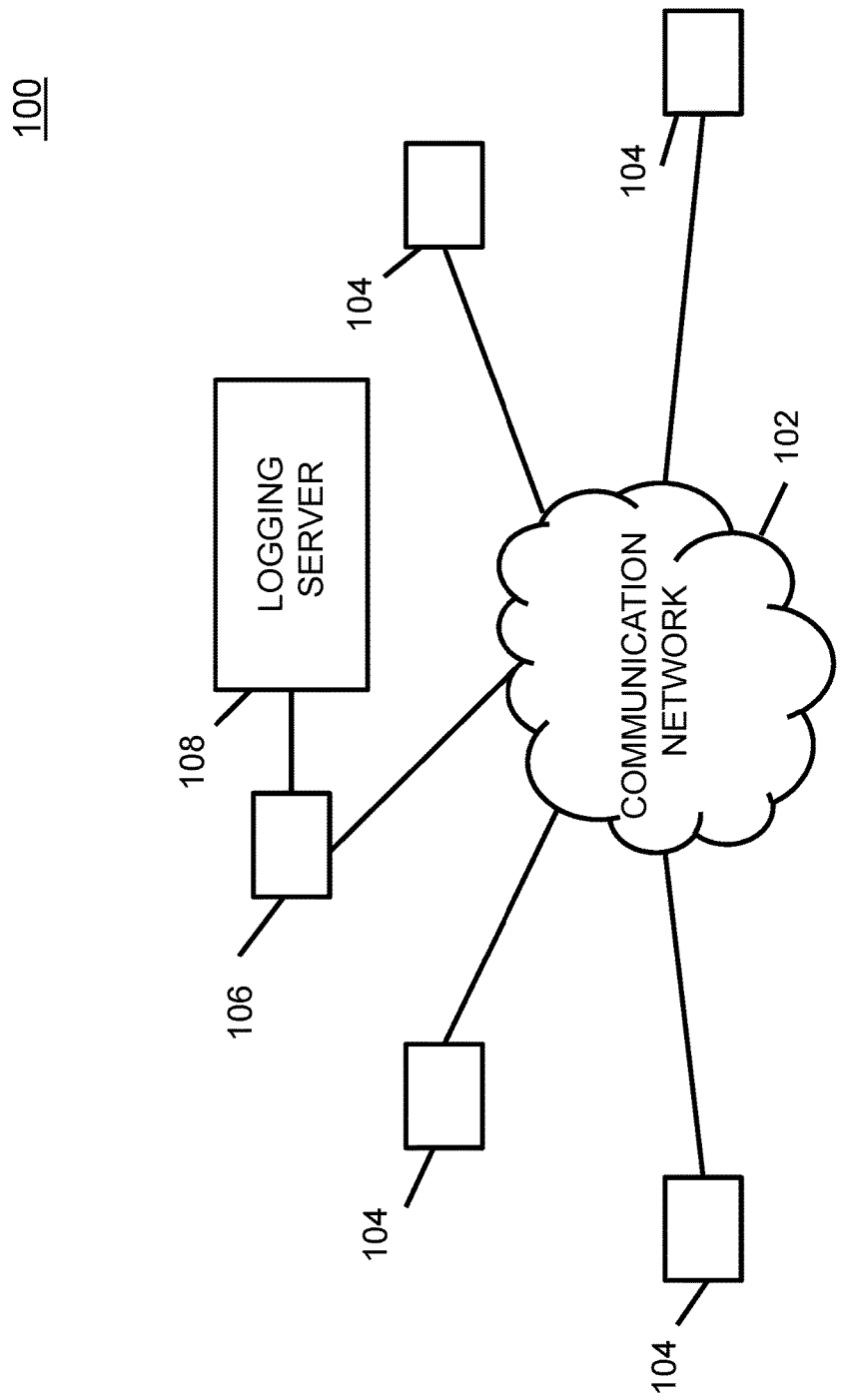
FIG. 1 is an example of a centralized system for throughput enhancement among ultra-low power wireless networked devices.

The disclosed subject matter relates to systems and methods for throughput enhancement among ultra-low power wireless networked devices such that it happens in an energy-aware manner. Specifically, the wireless devices need to be capable of identifying other devices that are within wireless communication range in order to exchange data.

This identification may be accomplished using throughput enhancement techniques that can be applied, for example, for neighbor discovery, which permit the devices to exchange identification information (e.g., by sending discovery messages) and/or any other suitable data. Specifically, this identification information is uniquely associated with the devices (or their corresponding objects), thus permitting the devices to actively detect one another. The neighbor discovery techniques account for the fact that the wireless devices alternate among different states (e.g., a listening state for receiving information from neighboring devices, a transmitting state for sending discovery messages, and a low power state or sleep mode). Each of these states is associated with different levels of energy consumption for the wireless devices. Moreover, each of the wireless devices may harvest/store and consume energy in a homogeneous manner (e.g., at the same rate using the same hardware and associated parameters) and/or in a heterogeneous manner (e.g., each wireless device has a different harvesting rate and/or hardware.)

Thus, there is a need for throughput enhancement techniques, including asynchronous neighbor discovery, among ultra-low power devices that are capable of listening for, and discovering, the neighboring wireless devices while efficiently accounting for energy constraints (e.g., homogeneous, heterogeneous).

Such efficient techniques avoid placing the devices in low-powered sleep states for prolonged periods of time, and also allow the devices to discover neighbors without exceeding the device's energy budget (e.g., harvested/stored energy). As a result, such techniques enable enhancing (e.g., maximizing) broadcast throughput of wireless devices subject to energy limits. Additionally, such techniques efficiently track and monitor objects associated with the wireless devices by accounting for changes in the membership of the wireless communication network. Furthermore, the use of asynchronous techniques (e.g., asynchronous neighbor discovery) in energy-constrained, ultra-low power wireless devices avoids hardware restrictions (e.g., those based on clock drifts) associated with synchronous techniques. Moreover, these types of techniques do not require any prior knowledge of the topology of the devices and can operate in a clique (e.g., where each pair of wireless device can exchange discovery messages and/or data) or non-clique formation. Additionally, these techniques allow for different topologies that may or may not require a coordinating or central node in order to synchronize and/or manage the discovery among the wireless devices and as a result can provide for both centralized and distributed communication systems. Furthermore, these types of techniques can account for changes in the topology of the communication network (e.g., wireless devices changing location over time) without the communication and transmission of control messages that create an overhead and can impact throughput enhancement techniques given the increased energy consumption. In addition, such control messages can have a negative impact on the device's energy budget since they would prevent the device from entering a sleep state in order to conserve/restore energy.

The following description starts with an overview of an exemplary system illustrating the operational environment of the inventive principles described herein. Further details are provided regarding the system components and processes that may be implemented in accordance with the various embodiments of the inventive principles.

In the following description, reference is made to the accompanying drawings that that form a part hereof, and in which is shown by way of illustration specific embodiments in which the inventive principles may be practiced. It is to be understood that other embodiments may be utilized and structural changes may be made without departing from the scope of the disclosed subject matter.

Referring now to the drawings in which like numerals represent the same or similar elements, FIG. 1 represents an overview of a centralized system 100 for enhancing throughput and providing asynchronous discovery among ultra-low power wireless networked devices. System 100 provides a solution to the problem of discovering neighboring devices in a wireless communication network by configuring the devices to determine optimal durations when said wireless devices 104 are listening for discovery messages transmitted by their neighbors, as well as durations for which the wireless devices are sleeping. The devices 104 are then configured to change states based on the determined durations, thereby ensuring that their energy consumption does not exceed an energy budget that is required for perpetual operation of the wireless devices.

In some embodiments, system 100 can have a plurality of wireless devices 104 that can wirelessly communicate and identify one another through a network 102 by transmitting and receiving discovery messages. The network may be any type of network such as one that includes the local area network, the Internet, a wide area network, an intranet etc. Logging wireless device 106 can monitor the transmission of discovery messages through the wireless network and report all received discovery messages to logging server 108 for storage and subsequent processing.

Wireless devices 104 and logging device 106 can be ultra-low power energy-harvesting devices or any other type of ultra-low power wireless device. Each of the wireless devices 104 can be equipped with energy-harvesting circuitry (e.g., a solar panel) that is capable of accumulating energy, an energy storage medium (e.g., batteries, capacitor), a transceiver for low-power wireless communication, a storage device (e.g., RAM, ROM etc.), a computer storage devices, and a hardware processor (e.g., a microprocessor or central processing unit) that is capable of executing computer program instructions.

Logging server 108 can include one or more hardware processors and one or more data storage devices for processing and storing the discovery messages reported by logging device 106. In some embodiments, logging server 108 can communicate with any of the wireless devices 104.

It should be noted that the system in FIG. 1 is merely meant to demonstrate an exemplary embodiment of an operating environment and should not be construed as limiting in any manner whatsoever. The particular configuration in FIG. 1 can be altered in numerous ways without departing from the principles herein. For example, wireless devices 104 can be connected directly to logging server 108 through wireless network 102 and eliminate the need for logging wireless device 106. Additionally, the functionality provided by logging server 108 may be performed locally on wireless devices 104 by using, for example, an application that executes locally at wireless devices 104. Furthermore, the wireless devices 104 and logging wireless device 106 may be connected to the network 102 using wired connections in accordance with some embodiments.

Figure 2A:
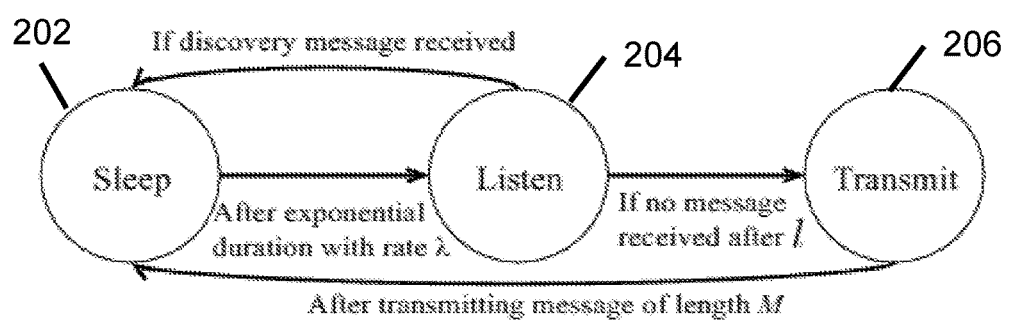
FIG. 2A is an example of a transition diagram illustrating the different operation states of centralized ultra-low power wireless networked devices.

FIG. 2A illustrates a transition diagram in accordance with some embodiments of the disclosed subject matter. Specifically, in some embodiments the ultra-low power wireless networked devices 104 can operate under a centralized model whereby they transition from a sleep to listen to transmit and then back to sleep operation state. For example, a wireless device 104 that is in a sleep state 202 follows a probabilistic approach where the sleeping duration $\tau$ is exponential with a sleep rate $\lambda$ such that $Pr(\tau > t) = e^{-\lambda t}$, thus preventing any unwanted synchronizations between wireless devices 104. Following operation in the sleep state, wireless device 104 awakens and enters a listen state 204 for a fixed duration of l (ms) whereby it listens for any data (e.g., discovery messages) from neighboring wireless devices. If wireless device 104 receives a message then it remains in the listen state until the reception of the message is completed. If, however, wireless device 104 does not receive a message or any other suitable data from its neighboring devices then it transmits suitable data and/or a discovery message. In some embodiments such message is of a fixed duration M (ms) or any other suitable duration. In addition, after wireless device has transmitted data while operating at transmit state 206, it returns to sleep state 202 to conserve energy.

Figure 2B:
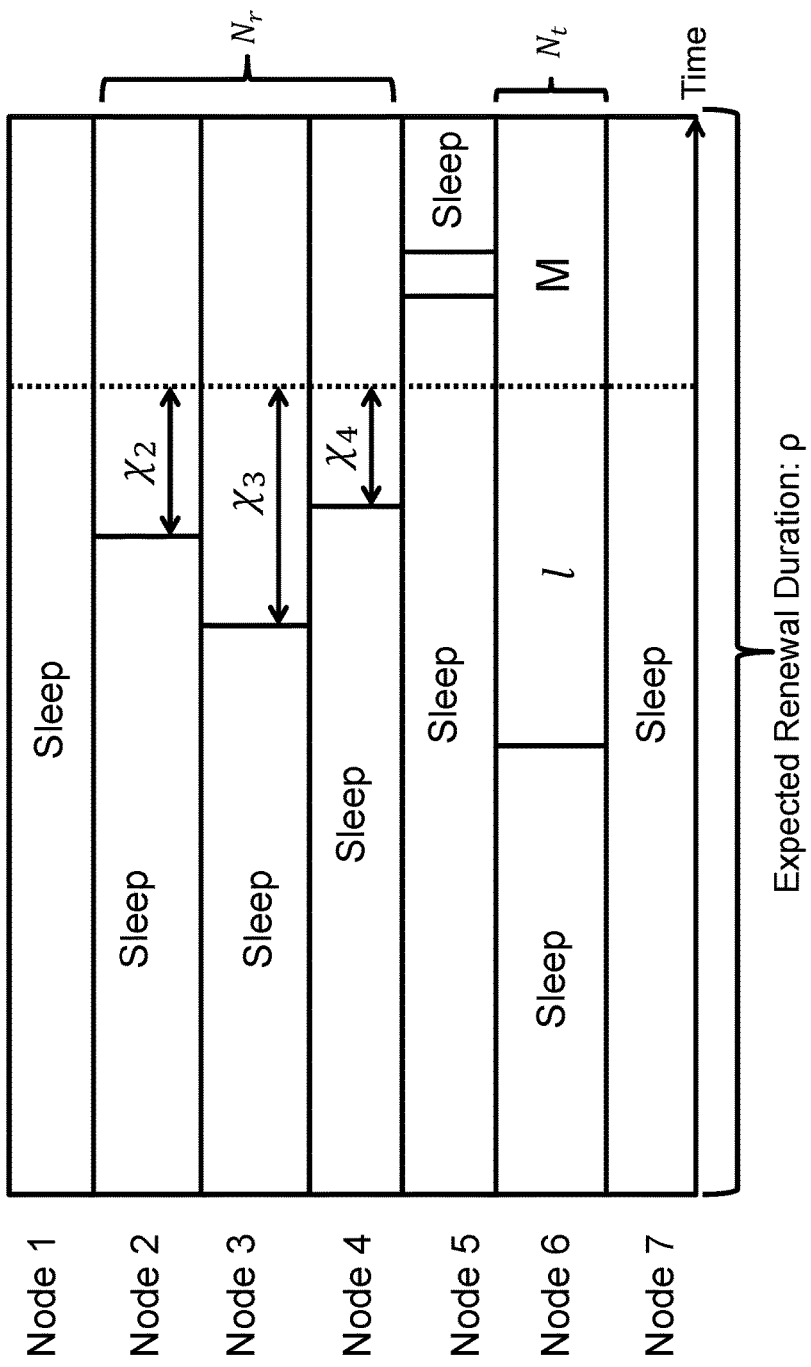
FIG. 2B is an example of the different operations of ultra-low power wireless networked devices based on the transition diagram referenced in FIG. 2A.

FIG. 2B illustrates the operation techniques of multiple wireless devices 104 based on the transition diagram referenced in FIG. 2A. Specifically, FIG. 2B shows multiple wireless devices 104 that form a network. In some embodiments, such operation techniques are achieved through the use of renewal theory. For example, multiple wireless devices 104 identified as Node 1, 2 . . . 7 in FIG. 2B initiate a renewal process of an expected duration $\rho$ by being in a sleep state end terminate the renewal process once a wireless device has transmitted suitable data (e.g., discovery message). During each renewal process, the first wireless device 104 (e.g., Node 6) to wake up begins its listen state 202 and after a duration l, it transmits a discovery message or any other suitable data. Furthermore, wireless devices 104 that are listening and waiting to receive data from one or more neighboring devices will remain in that state until the transmission is completed and upon receipt of the data will enter sleep state 202. In addition, if a wireless device 104 (e.g., Node 5) wakes-up during the transmission of data of a neighboring device it will immediately return to sleep state 202.

Figure 3:
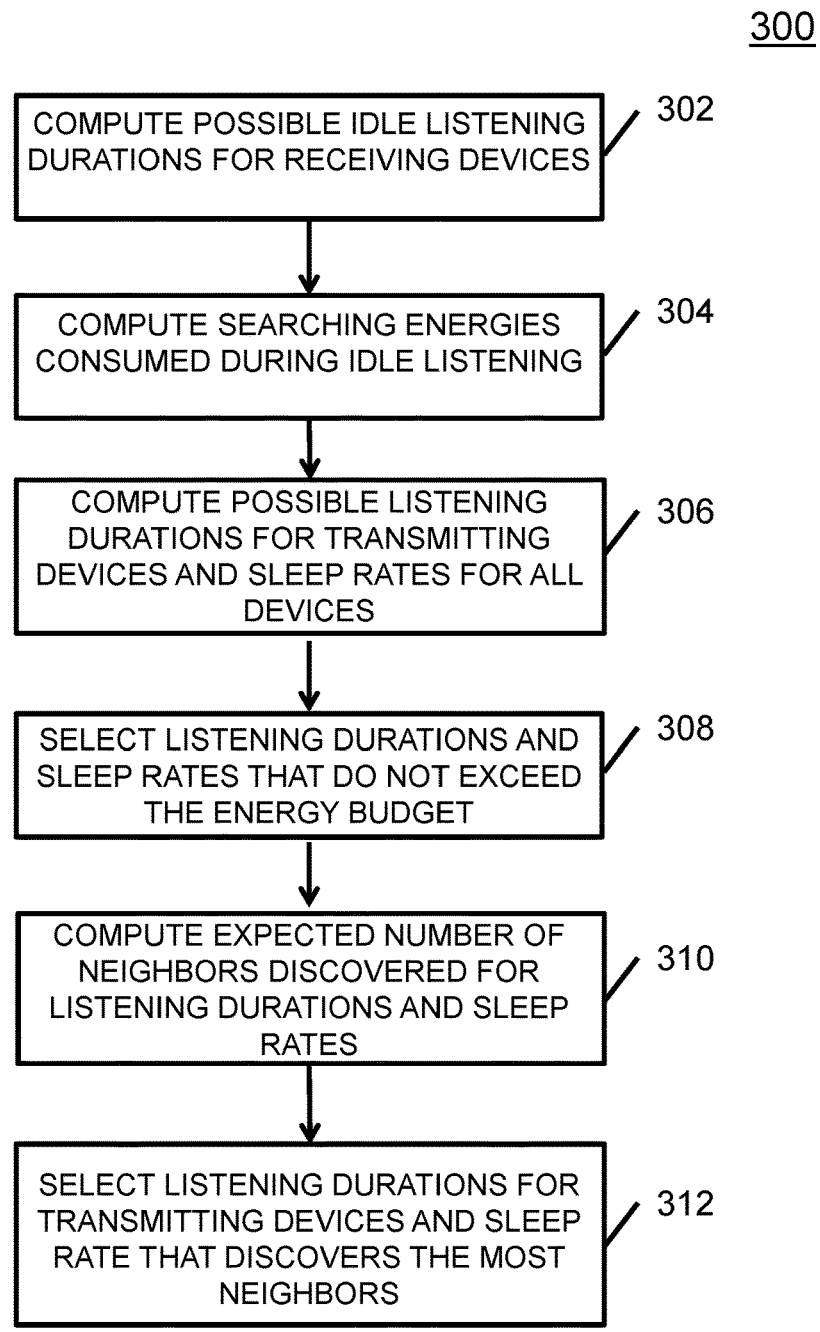
FIG. 3 is an example of a process that provides centralized throughput enhancement among homogeneous ultra-low power wireless networked devices.

FIG. 3 illustrates an exemplary method 300 for throughput enhancement among ultra-low power wireless networked devices in accordance with some embodiments of the disclosed subject matter. In some embodiments, method 300 can be employed on a centralized network of homogeneous wireless devices 104 whereby the devices share similar parameters and hardware characteristics (e.g., energy harvest rate, listening duration etc.) and where the number of wireless devices forming the network as well as their energy budgets/constraints are assumed to be known. Specifically, in such cases, wireless devices 104 rotate between a low-power sleep state, a listen state and transmit state as previously referenced in FIG. 2A in order to conserve energy and ensure perpetual operation while increasing the rate of discovering neighboring wireless devices by receiving data (e.g., discovery messages). As a result, method 300 describes discovery of neighboring devices through an energy aware manner that in some embodiments can be described using the following equations:

$$\max_{\lambda, l} U := \frac{E\{|N_{rx}|\}}{E[\rho]}, \text{s.t.} \frac{S}{E[\rho]} \le E_S$$

$$\text{Where: } E[\rho] = \frac{1}{\lambda N} + l + M$$

$$E[|N_{rx}|] = (N-1)(1 - e^{-l\lambda})$$

$$S = \sum_{y=0}^{2} Pr(Y = y) s(y)$$

$$s(0) = C_{rx} l + C_{tx} M$$

$$s(1) = C_{rx}(E[\chi] + M)$$

$$s(2) = 0$$

Specifically, the objective function U equals the expected number of discovered neighboring wireless devices 104 ($E\{|N_{rx}|\}$) per the average renewal duration ($E[\rho]$) and the goal of method 300 is to compute the listening duration l and sleep rate $\lambda$ for each wireless device 104 such that the objective function U is maximized (i.e., maximize the number of discovered neighboring wireless device), while ensuring that the average energy consumed during the renewal duration does not exceed the energy budget ($E_S$). In addition, the average renewal duration $E[\rho]$ equals the time it takes for N wireless devices 104 to wake up (which happens with a rate $\lambda N$), listen for a period l (e.g., listening duration) and transmit a message for a period M. In some embodiments, the expected number of discovered neighboring wireless devices 104 $E\{|N_{rx}|\}$ is computed by taking into account that only one wireless device is transmitting a message and as a result the remaining N−1 devices are equally likely to hear and receive the transmitted message. This event can occur with probability $1-e^{-l\lambda}$. Moreover, the expected energy consumed per wireless device 104, S consists of the energy consumption of a wireless device that is transmitting data (e.g., a discovery message) s(0) and is associated with a listening/receiving cost $C_{rx}$ (mW) and a transmitting cost $C_{tx}$ (mW). For a wireless device that receives a transmission, the energy consumption s(1) includes the energy spent during idle listening $E[\chi]$ (e.g., listening before a transmission has started). In some embodiments, the computation of Pr(Y=y) for y=0, 1 is obtained by taking into account that wireless devices 104 are homogeneous. As a result, provided that there is only one wireless device transmitting during a renewal then $$Pr(Y=0) = \frac{1}{N}$$

and the remaining N−1 wireless devices will receive the transmission with probability $$Pr(Y=1) = \frac{(1-e^{-\lambda l})(N-1)}{N}.$$

Initially, at 302, one or more of wireless devices 104 compute a set of possible listening durations for wireless devices 104. The listening durations indicate the length of time that wireless devices 104 will be configured in an idle listening state, during which the devices 104 actively listen for discovery messages from neighboring devices 104, prior to receiving a discovery message. In some embodiments, the idle listening durations are computed such that the energy consumed by the wireless devices when operating in the listening state does not exceed the harvested energy budget. At 304, a set of searching energies is computed indicating the energy that wireless devices 104 consume when actively listening for discovery messages from neighboring wireless devices 104.

At 306, the wireless devices 104 compute a set of potential listening durations that indicate the potential amount of time that the devices will operate in their listening states prior to transmitting a discovery message. This computation is based on the searching energies computed at 102. A set of potential sleep rates associated with the sleeping durations for wireless devices 104 is also computed at 306. The sleep rates indicate how often and when the devices 104 will enter sleep states and determine the sleeping durations. No energy is consumed by a wireless device 104 when in a sleep state. At 308, the listening durations and sleep rates that allow wireless devices 104 to operate without consuming more energy than the energy budget are retained, while those that do not allow for such are eliminated from contention. At 310, the remaining listening periods and sleep rates are used to compute the expected number of discovered neighboring wireless devices within the network. Finally, at 312, listening periods and sleep rates are selected for wireless devices 104 that allow for the largest number of wireless devices to be discovered within the network.

In some embodiments, calculating the listening duration and sleep rates that allow wireless devices 104 to operate without consuming more energy than the provided energy budget can be accomplished in a naïve manner whereby the listening duration of a wireless device is set according to the number N of wireless devices 104 forming a network. This is accomplished using the steps shown in Table 1.

TABLE 1

Energy-Aware Discovery (EAD)—Naïve

Step 1: $\iota \leftarrow (N-1)M$

Step 2: Find $\lambda$ such that $\frac{S}{E[\rho]} = E_S$

Step 3: return $\iota, \lambda$

Furthermore, in some embodiments, method 300 can provide the configuration parameters $l, \lambda$ for wireless device 104 using the steps shown in Table 2.

TABLE 2

Energy - Aware Discovery (EAD) - Configuration

Step 1: for K = 0 to $E_s/C_{rx}$ do
Step 2: Substitute s(1) for $\bar{s}(1) = l\lambda C_{rx}(K+M)$
Step 3: Invoke procedure AUX to obtain l, $\lambda$
Step 4: If l, $\lambda$ satisfy the original EAD constraints then
Step 5:   compute the discovery rate U
Step 6: return l, $\lambda$ that maximized U in step 5

Where the auxiliary (AUX) procedure is described in Table 3.

Auxiliary Procedure

Step 1: Find f such that $\lambda = f(\iota)$ when $\frac{S}{E[\rho]} = E_S$

Step 2: Substitute $f(\iota)$ with $\lambda$ in the objective function U
Step 3: Find the critical points for $\iota, \lambda$ by taking the derivative of U w.r.t $\iota$
Step 4: return $\iota, \lambda$ In some embodiments, wireless devices 104 are heterogeneous and as a result their configurable parameters change dynamically since their power consumption rates differ. In addition, in some embodiments the number N of wireless devices is not known in advance. In such cases, wireless devices 104 operate similarly to as discussed above by transitioning between the sleep, receive and transmit states. However, given the varying power consumption, the sleeping duration (e.g., sleep rate $\lambda$) is dynamic and adapted based on the stored energy levels (e.g., voltage levels of capacitor.) As a result, if a wireless device consumes too much energy then its voltage will drop and it will adapt its operation by remaining in a sleep state for longer durations. Specifically, when $P_b$ represents an estimated power budget for wireless device 104 such that the wireless device can, for example, harvest power at varying levels around $P_b$ then the sleep duration is scaled such that the anticipated power consumption is 0.01 mW when the capacitor voltage is $V_{cap}$=3.6V and is $P_b$ when $V_{cap}$=3.8V. As a result, the desired power consumption $P_{des}$ for wireless device 104 is computed as follows:

$$P_{des}(V_{cap}) = \frac{P_b - 0.01}{3.8 - 3.6}(V_{cap} - 3.6) + 0.01, \; 3.6 \leq V_{cap} \leq 4.$$

Furthermore, the estimated power consumption for a wireless device is computed as follows:

$$P_{est} = \frac{P_r l + P_t M + C_{sr} + C_{ts}}{1/\lambda + l + M}$$

where $P_r$ is the power consumption of wireless device 104 when receiving data (e.g., a discovery message) and $P_t$ is the power consumption of wireless device 104 when transmitting data. As a result, the sleeping duration for wireless device 104 is computed as a function of $V_{cap}$ by solving $P_{est}=P_{des}$ as shown in the following equation:

$$\frac{1}{\lambda} = \frac{P_r l + P_t M + C_{sr} + C_{ts}}{P_{des}(V_{cap})} - l - M.$$

Figure 4:
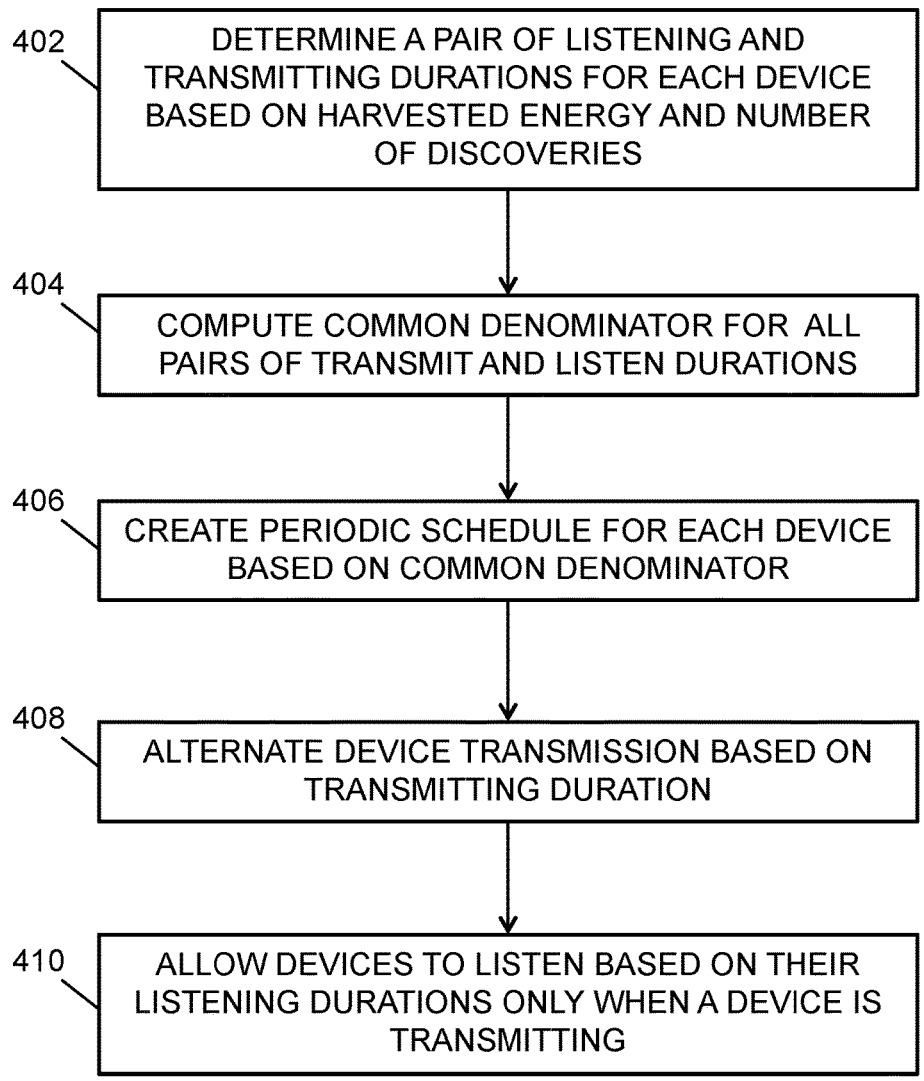
FIG. 4 is an example of a process that provides throughput enhancement among ultra-low power wireless networked devices.

FIG. 4 illustrates an exemplary method 600 for throughput enhancement by providing centralized asynchronous discovery among ultra-low power wireless networked devices in accordance with some embodiments of the disclosed subject matter. Initially, at 402, wireless device 104 determines a pair of listening and transmit durations by computing the fraction of time slots f (e.g., fraction of slots in which wireless device 104 transmits) and g (e.g., fraction of time slots in which wireless device 104 listens). Specifically, in a collision-free system (e.g., only one device can transmit at a given time slot) wireless devices 104 would never listen at a time slot t where there was no transmitter. For example, determining the pair of listening and transmit durations can be described by the following optimization problem:
U:=max $\Sigma_i(0f_i+1g_i)$ which represents the total number of discovered neighboring devices and is subject to the following constraints:

$$f_i + g_i \leq 1, \forall i$$
$$f_i C_i^x + g_i C_i^l \leq 1, \forall i$$
$$\sum_i f_i \leq 1, \forall i$$
$$g_i \leq \sum_{i \neq j} f_j, \forall i$$

Where:
$f_i$ is the fraction of slots in which a wireless device transmits,
$g_i$ is the fraction of slots in which a wireless device listens,
$C_i^x$ is the cost of transmission for a wireless device,
$C_i^l$ is the cost of listening for a wireless device.

At 404, a common denominator D is determined for all pairs of transmit and listen durations for wireless devices 104. At 406, a periodic schedule is employed for each wireless device 104 such that each device takes turns transmitting data (e.g., discovery messages, information data and/or any suitable data messages) by performing fD transmissions as shown at 408. At 410, the remaining wireless devices are allowed to listen for gD time slots choosing time slots to listen only when a wireless device is transmitting.

In some embodiments, throughput enhancement by providing centralized asynchronous discovery among ultra-low power wireless networked devices can be achieved using a perturbation approach. In such cases, determining the sleep and listen durations employs an optimization technique that uses an entropy term as shown in the equation below:

max: $\Sigma_i g_i - \sigma \Sigma_i (f_i \log f_i + g_i \log g_i)$ where $\sigma$ is a constant.

In some embodiments, throughput enhancement among ultra-low power wireless networked devices can be achieved in a distributed manner in accordance with some embodiments of the disclosed subject matter. In such cases, each wireless device has knowledge only of its own configuration parameters which differ among the devices (e.g., heterogeneous). In order to compute the sleep and listen durations a perturbation technique is employed that includes an entropy based function and is formulated by the following optimization problem:

$$\max_{\pi} \sum_{Y \in y} \sum_{Y \in y}^{N} \gamma_i(Y)\pi(Y) - \sigma \sum_{Y \in y} \pi(x) \log \pi(Y)$$

subject to:

$$a_i c_i^x + \beta_i c_i^l \leq \lambda_i, \; i = 1, \ldots N,$$
$$\sum_{Y \in y} \pi(Y) = 1, \pi(Y) \geq 0.$$

Where $\gamma_i$ is the discovery rate of a wireless device when operating at a state Y and $\sigma$ is a positive constant.

In some embodiments, the above-referenced optimization problem can be solved using the Lagrangian function $L(\pi,\eta)$ where $\eta$ represents the Lagrange multiplier. In some embodiments, the difference between the energy harvesting and consumption rates of wireless device 104 can be measured by observing the behavior of the device's battery dynamics. Specifically, if each wireless device, i, knows its power consumption in transmit and listen operation states (i.e., $c_i^x$ and $c_i^l$) and $b_i(t)$, t≥0 is the battery level of device i at time t, then each wireless device 104 can compute and update its own Lagrange multiplier as follows:

$$\eta_i(kd) = \left(\eta_i((k-1)d) - \delta \frac{b_i(kd) - b_i((k-1)d)}{d}\right)^+, k = 1, 2, \ldots$$

Where $\eta_i(t)=\eta_i(kd)$ at times $t \in [kd, (k+1)d)$.

Figure 5:
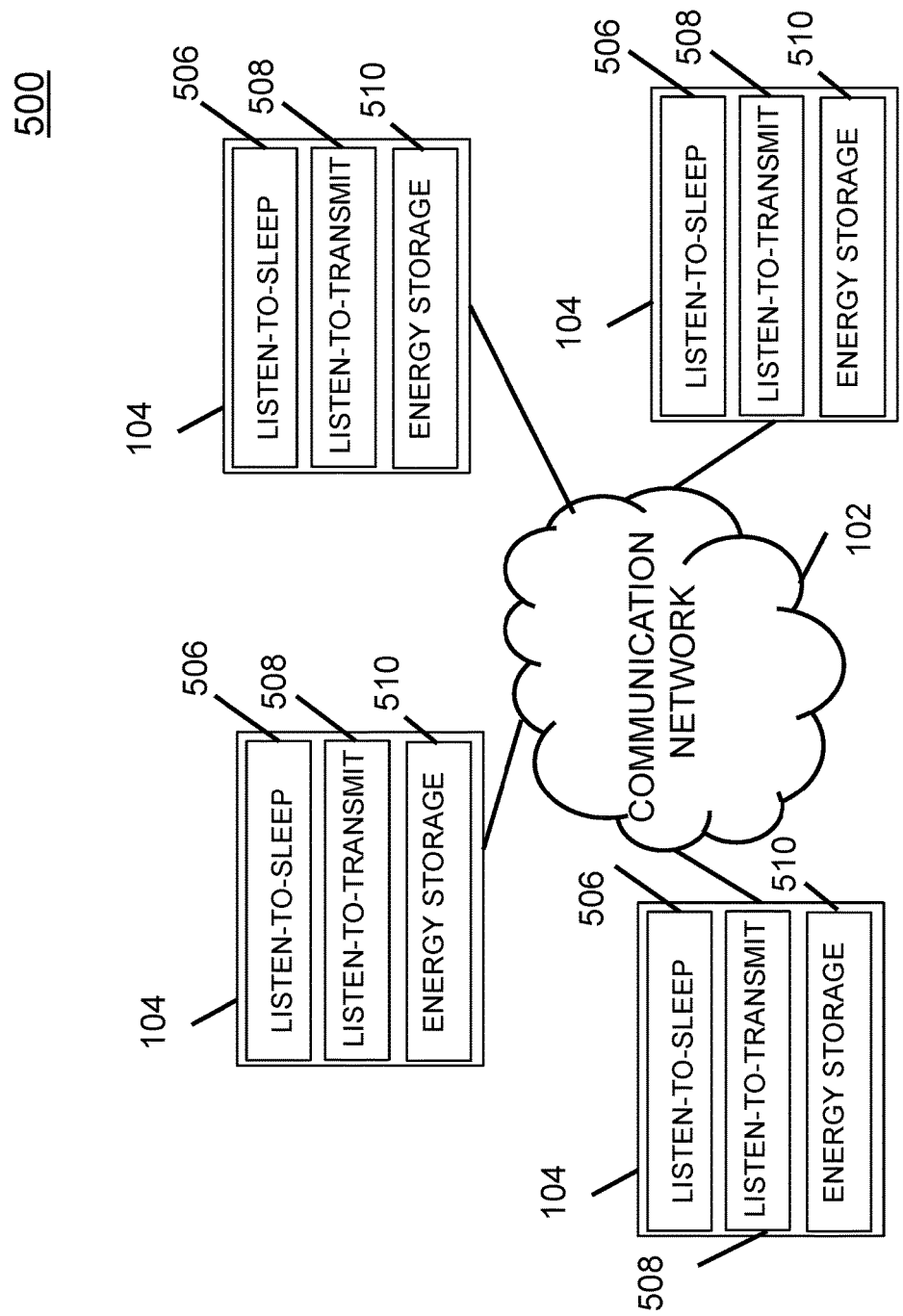
FIG. 5 is an example of a distributed system for throughput enhancement among ultra-low power wireless networked devices.

FIG. 5 illustrates an exemplary system 500 for throughput enhancement by providing distributed asynchronous discovery among ultra-low power wireless networked devices in accordance with some embodiments of the disclosed subject matter. System 500 provides a solution to the problem of adaptively discovering neighboring devices in a wireless communication network that can form different topologies (e.g., clique, mesh, star etc.) In such systems, each device is configured to dynamically determine optimal rates and thus durations during which wireless devices 104 are transmitting and listening for data (e.g., discovery messages, content-bearing messages and/or any suitable messages or information) from their neighbors. Devices 104 are configured to change states based on the determined durations, thereby ensuring that their energy consumption does not exceed an energy budget that is required for perpetual operation of the wireless devices.

In some embodiments, system 500 can have a plurality of wireless devices 104 that can wirelessly communicate and identify one another through a network 102 by transmitting and receiving data. The network may be any type of network such as one that includes the local area network, the Internet, a wide area network, an intranet, etc. Additionally, wireless devices 104 can be homogeneous or heterogeneous and form any topology (e.g., star, mesh, clique, etc.) In some embodiments, each of wireless devices 104 can include counters 502, 504 and an energy storage component 506 (e.g., battery, capacitor) that can determine when the wireless device alternates between different operation states. For example, in some embodiments, counter 502 can be a listen-to-sleep counter that determines if wireless device 104 enters a sleep state after consuming the stored energy. Furthermore, counter 504 can be a listen-to-transmit counter allowing wireless device 104 to transmit a discovery message by measuring changes in the stored energy and ensuring that there is enough energy to allow for the transmission of a discovery message. In some embodiments, such determination can be accomplished using entropy perturbation algorithms. In some embodiments, wireless devices 104 can dynamically determine and adjust the listen-to-sleep and listen-to-transmit counters and/or rates based on estimates of actively listening neighboring devices.

In some embodiments, wireless devices 104 can determine the optimal transmission, listening and sleep durations by computing the different combinations of operation states and selecting the set of operation states in a manner that allows for wireless devices to discover as many neighboring devices without exceeding their energy budget (e.g., harvested energy, battery levels etc.). In some embodiments, such determination can be accomplished using linear programming and numerical algorithms (e.g., simplex, interior point, etc.) In some embodiments water filling and round robin techniques can be used to iteratively determine durations during which wireless devices 104 are in the different operation states. In some embodiments, wireless devices 104 can determine a set of operation states by determining a number of time slots (e.g., a fraction of time) during which wireless devices 104 can transmit and receive data. In some embodiments, the time slots are determined by computing the number of discovered neighbors without exceeding the energy budget. In some embodiments, one of wireless devices 104 can be a coordinating device and determine the sleep, transmit and listen durations of wireless devices 104 in a centralized manner.

Wireless devices 104 can be ultra-low power energy-harvesting devices or any other type of wireless device. Each of the wireless devices 104 can be equipped with different energy-harvesting circuitry (e.g., a solar panel) that is capable of accumulating energy at the same or different harvesting rates, an energy storage medium (e.g., batteries, capacitor), a transceiver for low-power wireless communication, a storage device (e.g., RAM, ROM, etc.), a computer storage device, and a hardware processor (e.g., a microprocessor or central processing unit) that is capable of executing computer program instructions. In some embodiments, wireless devices 104 can include one or more hardware components associated with energy storage (e.g., batteries, cells, capacitors) and/or any suitable combination thereof.

It should be noted that the system in FIG. 5 is merely meant to demonstrate an exemplary embodiment of an operating environment and should not be construed as limiting in any manner whatsoever. The particular configuration in FIG. 5 can be altered in numerous ways without departing from the principles herein. For example, any of wireless devices 104 can be a coordinating device or any other suitable device such a server, computer and/or mobile device. Additionally, the functionality provided by the coordinating device may be performed locally on wireless devices 104 by using, for example, an application that executes locally at wireless devices 104. Furthermore, one or more of wireless devices 104 may be connected to the network 102 using wired connections in accordance with some embodiments.

Figure 6:
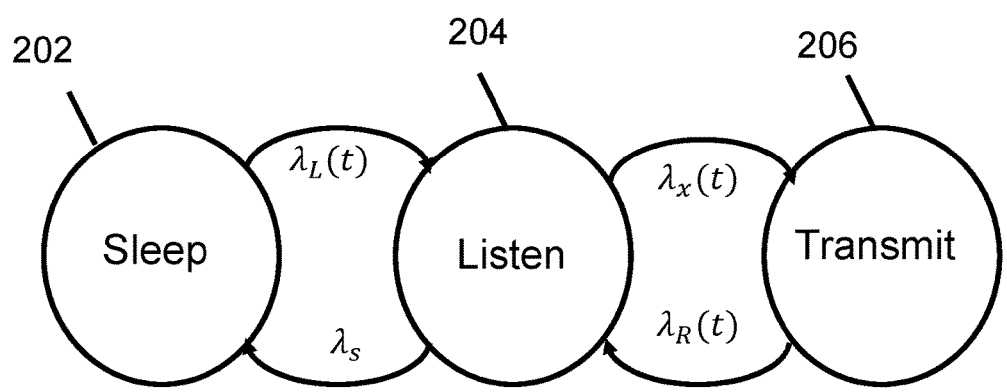
FIG. 6 is an example of a transition diagram that illustrates the operation states for distributed throughput enhancement among ultra-low power wireless networked devices.

FIG. 6 illustrates a transition diagram in accordance with some embodiments of the disclosed subject matter. Specifically, in some embodiments the ultra-low power wireless networked devices 104 can operate under a distributed model whereby wireless devices 104 pass from a listen state in order to move between the transmit and sleep operation states. For example, using a probabilistic framework, a wireless device's transition and duration of stay in one of the different operational states depends on the rate $\lambda_{ij}$, $i,j \in \{s, l, x\}$ where $\{s, l, x\}$ represent the sleep, listen and transmit operation states respectively. As a result, dynamically adjusting the rates $\lambda_{ij}$ for each of wireless devices 104 allows for the operation of the networked wireless devices in an energy aware manner such that the energy budgets are respected and perpetual operation can be achieved. Specifically, a wireless device 104 transitions from a sleep operation state 302 to a listen operation state 304 based on an adjustable sleep-listen rate $\lambda_{sl}$ and can subsequently enter transmit state 306 by adjusting a listen-transmit rate $\lambda_{lx}$. For example, in some embodiments, wireless device 104 can dynamically adjust its listen-transmit rate based on the number of neighboring wireless devices 104 that are in an actively listening state 304 and/or by taking into account its own energy reserves (e.g., battery/capacitor levels). In addition, once wireless device 104 has completed its transmission it returns to listen state 302 by adjusting its transmit-listen rate $\lambda_{xl}$ in order to receive data transmitted by its neighboring devices.

Figure 7:
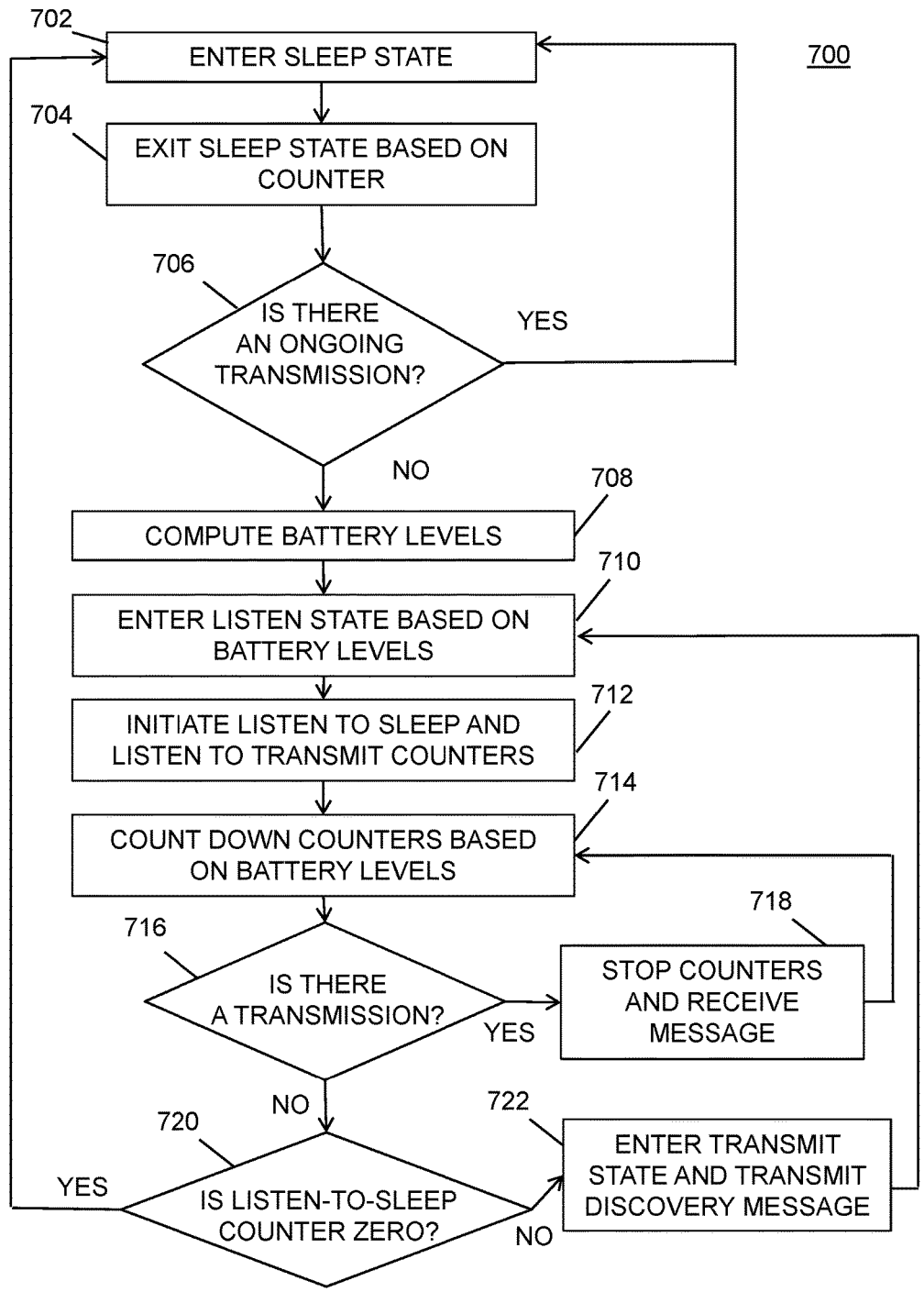
FIG. 7 is an example of a process that provides distributed throughput enhancement among ultra-low power wireless networked devices.

FIG. 7 illustrates an exemplary method 700 for throughput enhancement by providing distributed asynchronous discovery among ultra-low power wireless networked devices in accordance with some embodiments of the disclosed subject matter. Initially, at 702, wireless device 104 can be in a sleep state in order to conserve and/or restore energy and ensure near perpetual operation. At 704, wireless device 104 exits the sleep state after an amount of time that is determined by a counter. For example, in some embodiments, such a counter can be an exponentially distributed counter of unit rate, which is associated with the amount of energy that wireless device has harvested and can use for its operation. Additionally, when wireless device 104 exits the sleep state, it is no longer in a low power operation mode and can, for example, briefly activate its transceiver to detect a possible ongoing transmission of data (e.g., discovery messages). In some embodiments, wireless device 104 can wake-up and briefly enter a listening state in order to ascertain the utilization of the broadcast medium. In some embodiments, wireless device can enter the listen state with probability $$e^{\left(-\frac{1}{\sigma}\eta_i c_i^l\right)}.$$

At 706, if there is an ongoing transmission at the specific time slot (e.g., "YES" at 806) when wireless device 104 awakens, then wireless device 104 goes back into the sleep state at 702. If, however, there is no ongoing transmission (e.g., "NO" at 806) then wireless device 104 can determine if the energy budget (e.g., harvested and/or stored energy) is sufficient in order to enter a listen state to properly receive any data that is being transmitted (e.g., discovery message). To do so, wireless device 104 computes and determines the dynamics of its battery levels at 808. For example, in some embodiments, wireless device 104 can determine its own energy levels by observing the dynamics of its energy storage (e.g., battery, capacitor, etc.) Specifically, by computing the change of energy levels at each time slot t, wireless device 104 can obtain an estimate of the difference between the energy budget and the consumption rates and thus ensure that it will not exceed the energy budget. As a result, at 710 wireless device 104 can enter a listen state based on the changes in battery levels at different time slots and/or dynamically alter its transition from and to the listening state. In some embodiments, wireless device 104 can enter the listen state based on a probability determined by the battery levels and listening costs, otherwise it can enter the sleep state.

Once wireless device 104 has entered the listen state, it initiates two counters at 712. A listen-to-sleep counter that determines whether the wireless device will transition from a listen state to a sleep state and a listen-to-transmit counter that determines whether the wireless device will transmit a discovery message or any other suitable data to neighboring devices. In some embodiments, the counters are exponentially distributed and operate based on the battery levels and energy costs of the device. Upon initiating the counters, wireless device 104 proceeds to count down both counters to zero at 714. In some embodiments, the counters can be of exponential form and described by the following equation:

$$e^{(\frac{1}{\sigma}(\eta_i(t)(c_i^l - c_i^s) + \eta_i(t) - 1))}.$$

At 716, if wireless device 104 hears a transmission from neighboring devices (e.g., "YES", at 816) during the countdown, then wireless device 104 freezes the counters and receives the data (e.g., discovery message). If there is no transmission happening while wireless device 104 is listening (e.g., "NO" at 816) then the counters continue the count-down until one of the counters reaches zero. If, at 720, the listen-to-sleep counter reaches zero (e.g., "YES" at 720) then wireless device does not have enough remaining energy to operate and enters the sleep state at 702. If the listen-to-transmit counter reaches zero first (e.g., "NO" at 720) then wireless device 104 enters the transmit state and transmits, for example, a discovery message. Wireless device 104 can then go back at 710 and enter the listen state.

In some embodiments, wireless devices 104 can provide feedback to neighboring wireless devices in order to indicate that they have entered listen state 204 and are capable of receiving discovery messages and/or any suitable data. For example, in some embodiments wireless devices 104 can include information in their transmitted data that includes their expected listening duration. As a result, wireless device 104 can determine whether to transition to a transmit state 206 in order to maximize the number of neighboring wireless devices that will receive its transmission. In some embodiments, wireless device 104 can make such a transition determination by using one or more random timers to estimate the number of neighboring wireless devices that are in a listen state 204. In some embodiments, such feedback can be low cost, short pings that any other device can receive and that do not effectively consume additional bandwidth. In some embodiments, measuring the number of neighboring wireless devices and throughput in a broadcast environment can be achieved by counting each delivery of a bit (e.g., groupput) and/or by counting each transmission of a received bit once (e.g., anyput).

The embodiments described in this disclosure can be combined in various ways. Any aspect or feature that is described for one embodiment can be incorporated into any other embodiment mentioned in this disclosure. Moreover, any of the embodiments described herein may be hardware-based, software-based and/or comprise a mixture of both hardware and software elements. Accordingly, while various novel features of the inventive principles have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps of any described methods may be carried out in different orders in many cases where such may be appropriate. Those skilled in the art will recognize, based on the above disclosure and an understanding therefrom of the teachings of the inventive principles, that the particular hardware and devices that are part of the system described herein, and the general functionality provided by and incorporated therein, may vary in different embodiments of the inventive principles. Accordingly, the particular system components are for illustrative purposes to facilitate a full and complete understanding and appreciation of the various aspects and functionality of particular embodiments of the present principles as realized in system and method embodiments thereof. Those skilled in the art will appreciate that the inventive principles can be practiced in other than the described embodiments, which are presented for purposes of illustration and not limitation.

What is claimed is:

1. A system for throughput enhancement among ultra-low power wireless network devices, the system comprising:
   at least one ultra-low power wireless device configured to:
      accumulate energy using energy-harvesting circuitry that is configured to power a wireless device;
      determine a plurality of listening durations and a plurality of sleeping durations based on the accumulated energy;
      enter into a listening state having a listening duration selected from one of the plurality of listening durations, whereby the at least one ultra-low power wireless device is adapted to listen for a first discovery message;
      listen for the first discovery message through a wireless network during the listening duration;
      if the first discovery message is received during the listening duration, switch to a sleep state or remain in the listening state;
      if the first discovery message is not received during the listening duration, transmit a second discovery message through the wireless network upon expiration of the listening duration and transitioning to the sleep state; and
   a hardware processor configured to store and process the first and second discovery messages;
   wherein the at least one of the plurality of sleeping durations is dynamically scaled based on energy levels of the energy-harvesting circuitry such that the at least one of the plurality of sleeping durations will increase when the wireless device consumes energy causing its voltage level to drop;

wherein the at least one of the plurality of sleeping durations is determined based on a sleep rate, λ, and an exponential distribution such that:

$Pr(\tau > t) = e^{-\lambda t}$, where τ is the sleeping duration, t is time, and λ is fixed.

2. The system of claim 1, wherein the at least one of the plurality of listening durations and the sleep rate are determined by selecting the largest number of discovered wireless devices without consuming more than the accumulated energy.

3. A method for throughput enhancement among ultra-low power wireless network devices, the method comprising steps of:

computing a set of possible listening durations for a listening state and a set of possible sleep durations for a sleep state based on energy consumption of at least one wireless device;

computing, for each listening duration of the set of possible listening durations and each sleeping duration of the set of possible sleeping durations, a number of discovery messages expected to be received by at least one neighboring device within a predetermined amount of time operating under the listening duration and sleep duration;

selecting a listening duration from the set of possible listening durations and a sleep duration from the set of possible sleeping durations with the largest number of discovery messages expected to be received by the at least one neighboring device within the predetermined amount of time;

transmitting a discovery message after the selected listening duration expires without any discovery messages having been received during the selected listening duration; and entering a sleep state for the selected sleep duration upon transmitting the discovery message, wherein the selected sleep duration is dynamically scaled based on energy levels of the at least one wireless device such that the selected sleep duration will increase when the at least one wireless device consumes energy causing its voltage level to drop; and wherein the selected sleep duration is determined based on a sleep rate, λ, and an exponential distribution such that:

$Pr(\tau > t) = e^{-\lambda t}$, where τ is the sleeping duration, t is time, and λ is fixed.

4. The method of claim 3 further comprising consuming energy to transmit and receive discovery messages at a rate that does not exceed a rate of energy harvesting from the at least one wireless device.

5. A system for throughput enhancement among ultra-low power wireless network devices, the system comprising:

at least one ultra-low power wireless device configured to:
store energy that is configured to power a wireless device using energy-storing circuitry;
determine a listening duration for a listening state and a sleep duration for a sleep state based on the stored energy and an expected number of discovered neighboring devices;
enter into a listening state that lasts for the listening duration, whereby the at least one ultra-low power wireless device listens for a first discovery message;
listen for the first discovery message through a wireless network during the listening duration;
if the first discovery message is received during the listening duration, switch to the sleep state for the sleep duration;
if the first discovery message is not received during the listening duration, transmit a second discovery message through the wireless network upon expiration of the listening duration,
wherein the sleep duration for the sleep state is dynamically scaled based on energy levels of the energy-storing circuitry such that the sleep duration for the sleep state will increase when the at least one ultra-low power wireless device consumes energy causing its voltage level to drop; and
wherein the sleep duration for the sleep state is determined based on a sleep rate, λ, and an exponential distribution such that:

$Pr(\tau > t) = e^{-\lambda t}$, where τ is the sleeping duration, t is time, and λ is fixed.

6. A method for throughput enhancement among ultra-low power wireless network devices, the method comprising the steps of:

determining an energy consumption budget for at least one wireless device;
computing a plurality of idle listening durations during which other wireless devices are in a listening state prior to transmission of a discovery message by the at least one wireless device, wherein each of the idle listening durations is determined so as not to exceed the energy consumption budget available for operation of the at least one device during a listening state;
computing a plurality of energy consumption costs associated with the plurality of idle listening durations;
computing a set of possible listening durations and set of possible sleep durations so as not to exceed the the energy consumption budget based on the plurality of energy consumption costs;
for each listening duration of the set of possible listening durations and each sleeping duration of the set of possible sleeping durations, computing an expected number of discovered neighboring devices within a predetermined amount of time operating under the listening duration and sleep duration;
selecting from the set of possible listening durations and the set of possible sleeping durations a listening duration and a sleep duration based on the expected number of discovered neighboring devices within the predetermined amount of time;
transmitting a discovery message after the selected listening duration expires without any discovery messages having been received; and
entering a sleep state for the selected sleep duration upon transmitting the discovery message,
wherein the selected sleep duration is dynamically scaled based on energy levels of the at least one wireless device such that the selected sleep duration will increase when the at least one wireless device consumes energy causing its voltage level to drop; and
wherein the selected sleep duration is determined based on a sleep rate, λ, and an exponential distribution such that:

$Pr(\tau > t) = e^{-\lambda t}$, where τ is the sleeping duration, t is time, and λ is fixed.

7. The method of claim 6, wherein the listening and sleep duration set is selected according to a number that maximizes the expected discovered neighboring devices within the predetermined amount of time.

8. A method for throughput enhancement among ultra-low power wireless network devices, the method comprising the steps of:
    determining an energy consumption budget for at least one wireless device based on energy stored by the at least one wireless device using energy-storing circuitry;
    determining an estimated power consumption budget for the at least one wireless device based on one or more configurable parameters of said at least one wireless device;
    computing a sleep duration such that an estimated power consumption budget does not exceed the energy consumption budget;
    entering a listening state for a listening duration, whereby the at least one ultra-low power wireless device listens for a discovery message;
    transmitting a discovery message after the listening duration expires without any discovery messages having been received; and
    entering a sleep state for the selected sleep duration upon transmitting the discovery message,
    wherein the selected sleep duration is dynamically scaled based on energy levels of the at least one wireless device such that the selected sleep duration will increase when the at least one wireless device consumes energy causing its voltage level to drop; and
    wherein the selected sleep duration is determined based on a sleep rate, $\lambda$, and an exponential distribution such that:
$Pr(\tau > t) = e^{-\lambda t}$, where $\tau$ is the sleeping duration, t is time, and $\lambda$ is fixed.

9. A system for throughput enhancement among ultra-low power wireless network devices, the system comprising:
    a plurality of ultra-low power wireless devices, each being configured to:
        store energy in an energy storage medium configured to power the wireless device;
        dynamically alternate between a sleep state, a listen state and a transmit state;
        communicate with neighboring devices by transmitting a data message when in the transmit state and receiving a plurality of data messages from neighboring devices when in the listen state;
        determine a listening duration and a transmitting duration, wherein both the listening duration and the transmitting duration are determined using counters based on the plurality of received data messages, a set of configurable parameters associated with the wireless device, and at least a portion of the stored energy consumed when in the listen state and the transmit state; and
        enter a sleep state for a remaining duration of time upon consuming the at least a portion of the stored energy,
    wherein the sleep state has a duration that is dynamically scaled based on energy levels of the energy storage medium such that the sleep state duration will increase when the wireless device consumes energy causing its voltage level to drop;
    wherein the duration of the sleep state is determined based on a sleep rate, $\lambda$, and an exponential distribution such that:
$Pr(\tau > t) = e^{-\lambda t}$, where $\tau$ is the sleeping duration, t is time, and $\lambda$ is fixed.

10. The system of claim 9 further comprising at least one coordinating wireless device comprising a hardware processor and configured to iteratively determine for each of the plurality of ultra-low power wireless devices a set of durations associated with their respective listen and transmit states.

11. The system of claim 9, wherein each of the plurality of ultra-low wireless devices is configured to transmit the data message during a time slot.

12. The system of claim 11, wherein the time slot is determined based on the size of the data message.

13. The system of claim 11, wherein each of the plurality of ultra-low power wireless devices is configured to periodically transmit a data message with a period associated with a plurality of time slots during which the plurality of devices are listening.

14. The system of claim 9, wherein the listening duration and the transmitting duration are determined based on the stored energy at different time periods.

15. The system of claim 9, wherein each of the plurality of ultra-low power wireless devices is configured to transmit feedback after exiting a transmit state.

16. The system of claim 9, wherein throughput is measured based on a number of neighboring devices receiving a data message.

17. The system of claim 9, wherein throughput is measured based on the wireless device transmitting a data message.

18. A method for throughput enhancement among ultra-low power wireless network devices, the method comprising the steps of:
    causing at least one wireless device to enter a sleep state to conserve energy;
    storing energy as stored energy in an energy storage medium configured to power the at least one wireless device;
    causing the at least one wireless device to enter a listen state based on the stored energy;
    initiating at least one counter coupled to the at least one wireless device, wherein the at least one counter is configured to count down based on a measured level of stored energy in the at least one device such that the at least one device determines when to transition from the listen state;
    while the at least one device is still in a listen state, causing the at least one wireless device to pause the at least one counter and receive a data message from at least one neighboring device;
    causing the at least one wireless device to resume the counter based on the level of the stored energy and upon determining a transition from the listen state,
    causing the at least one wireless device to transition from the listen state to the transmit state; and
    causing the at least one wireless device to enter the listen state after transmitting a data message to the at least one neighboring device,
    wherein the sleep state has a duration that is dynamically scaled based on energy levels of the energy storage medium such that the sleep state duration will increase when the wireless device consumes energy causing its voltage level to drop;
    wherein the duration of the sleep state is determined based on a sleep rate, $\lambda$, and an exponential distribution such that:
$Pr(\tau > t) = e^{-\lambda t}$, where $\tau$ is the sleeping duration, t is time, and $\lambda$ is fixed.

19. The method of claim 18, wherein the at least one counter is an exponentially distributed counter.

20. The method of claim 18, further comprising causing the at least one wireless device to transmit feedback after exiting the transmit state.

21. A method for throughput enhancement among ultra-low power wireless network devices, the method comprising the steps of:
- storing energy as stored energy in an energy storage medium configured to power at least one wireless device;
- asynchronously receiving a first plurality of discovery messages by the at least one wireless device from a plurality of neighboring devices;
- asynchronously transmitting a second plurality of discovery messages from the at least one wireless device to the plurality of neighboring devices; and
- causing the at least one wireless device to transition between a sleep state, a listen state and a transmit state based on the stored energy in the energy storage medium and based on the receipt and transmittal of the plurality of discovery messages,
- wherein the sleep state has a duration that is dynamically scaled based on energy levels of the energy storage medium such that the sleep state duration will increase when the wireless device consumes energy causing its voltage level to drop;
- wherein the duration of the sleep state is determined based on a sleep rate, $\lambda$, and an exponential distribution such that:

$Pr(\tau > t) = e^{-\lambda t}$, where $\tau$ is the sleeping duration, t is time, and $\lambda$ is fixed.

* * * * *